Dec. 8, 1936.  J. J. GRODEN  2,063,092

TIRE CARRIER

Filed Dec. 27, 1934  2 Sheets-Sheet 1

INVENTOR:
JOHN J. GRODEN

Dec. 8, 1936.  J. J. GRODEN  2,063,092

TIRE CARRIER

Filed Dec. 27, 1934  2 Sheets-Sheet 2

WITNESSES:

INVENTOR:
JOHN J. GRODEN
BY Joshua R. H. Potts
ATTORNEY

Patented Dec. 8, 1936

2,063,092

UNITED STATES PATENT OFFICE 2,063,092

TIRE CARRIER

John J. Groden, Philadelphia, Pa.

Application December 27, 1934, Serial No. 759,333

8 Claims. (Cl. 224—29)

This invention relates to tire carriers, and has for an object to provide a new and improved carrier for automotive vehicles which will enclose the tire within the body of the vehicle in an improved manner.

A further object of the invention is to provide a tire carrier in the shape of a drawer which is manually movable into and out of a compartment formed therefor in a car body, and presents new and improved features of convenience and stability of the tire.

A further object of the invention is to provide a tire carrier of the drawer type which, when withdrawn from the vehicle, automatically loosens the tire so that it may be removed from the carrier.

A further object of the invention is to provide a tire carrier of the drawer type having a compartment for containing the drawer, said compartment having a closure which automatically locks the tire against vibration and conforms to the shape of the body surrounding said closure.

A further object of the invention is to provide a tire carrier including a compartment with a cradle to be moved slidably into and out of said compartment, said cradle having means limiting the outward movement and providing for a downward swing of the outer end to a position adjacent to the ground and with improved means for wedging the cradle in firm position when the cradle and tire have been inserted into the compartment.

The invention, therefore, comprises a compartment which is preferably, though not necessarily, or essentially built into the body of the vehicle, and preferably, though not essentially, into the rear of said body, said compartment having a closure corresponding in contour to the parts of the body surrounding said closure and within the compartment a cradle mounted to slide in guideways provided by the compartment, to be withdrawn to such extent as to entirely clear the carried tire from obstruction and to automatically release the holding means when the cradle has been withdrawn, with wedging means carried partly by the compartment and partly by the closure for wedging the cradle against vibration or movement within the compartment when the closure is closed and to hold the tire firmly against movement relative to the cradle by the same action.

Figure 2:
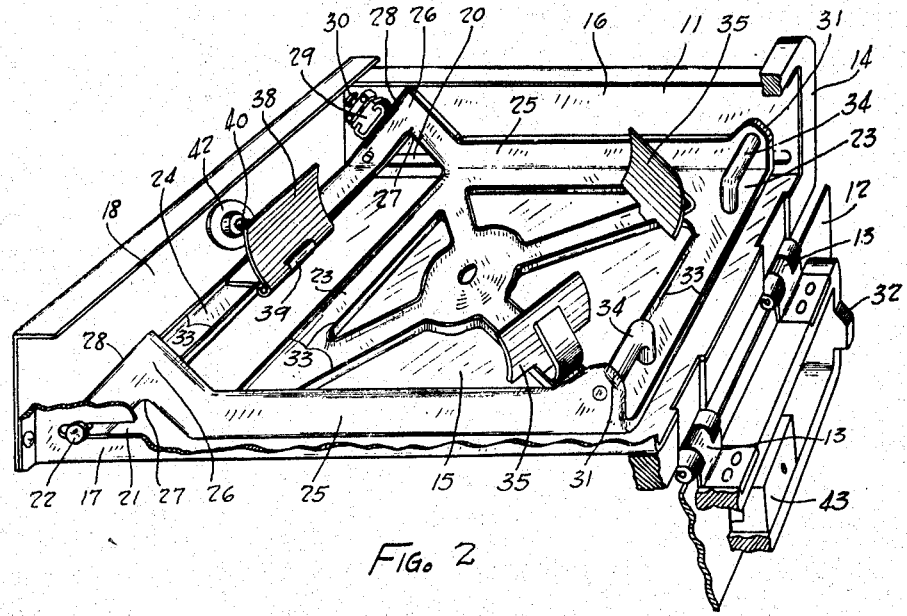
Figure 1:
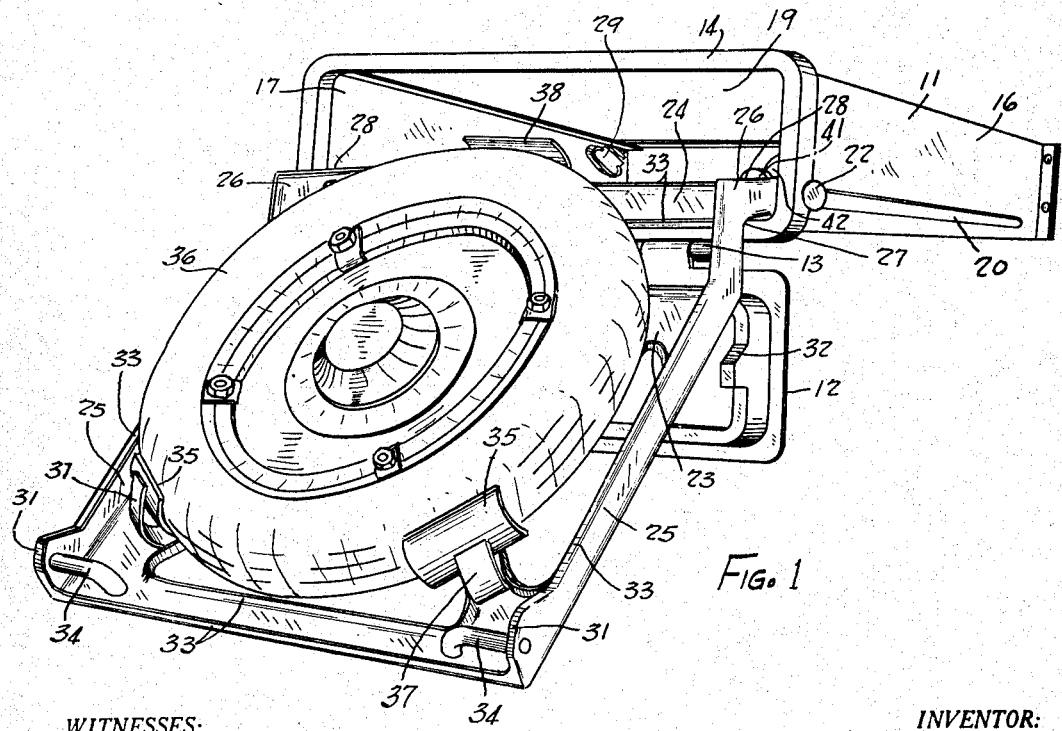
Figure 4:
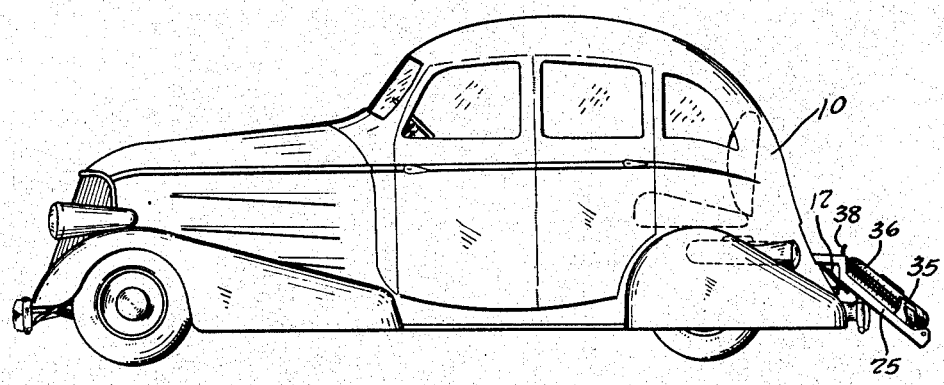
Figure 6:
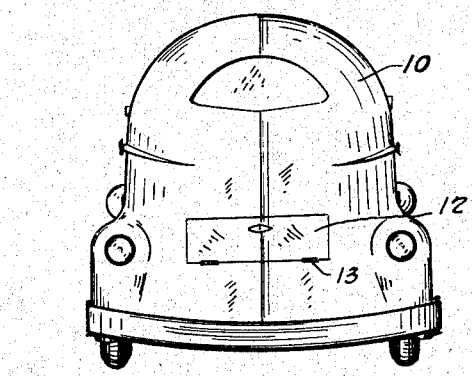
Figure 5:
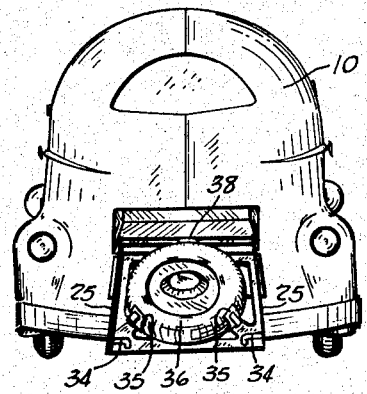
Figure 3:
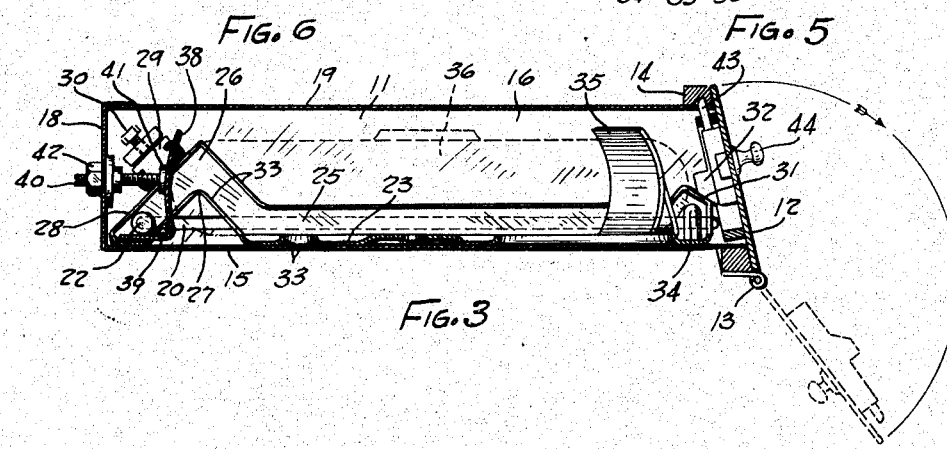

The drawings illustrate an embodiment of the invention and the views therein are as follows:

Figure 1 is a perspective view of the compartment separated from the vehicle body, shown in open position with the tire held at an inclination to provide ease of removement, Figure 2 is a perspective view, parts being broken away, showing the cradle which carries the tire enclosed within the compartment, but with the tire removed and with the closure opened, Figure 3 is a longitudinal sectional view through the compartment and cradle, with the tire shown in dotted lines and the closure in dotted lines, shown in open position, Figure 4 is a view in side elevation of a vehicle embodying the present invention, with the cradle and tire withdrawn from the body in position to be convenient upon the cradle, Figure 5 is a view of a vehicle body in rear elevation showing the cradle withdrawn with a tire applied thereto and the closure opened, and Figure 6 is a view of a vehicle body in rear elevation with the closure closed.

The present invention is adapted to be associated with vehicle bodies of a great variety of types, and the body 10 as shown in the drawings is only by way of illustration. A compartment is provided within the body, preferably in the rear, as indicated at Figures 4, 5, and 6, but not limited thereto. A compartment 11 is shown in the drawings as being a complete unit adapted to be set into a vehicle body, but it is obvious that in use various parts of the body structure may be employed, as parts of the compartment, without departing from the invention and the description of the compartment as a unit, are not to be understood as any limitation.

When set into the body a closure 12 is hinged at 13, which hinging may be directly onto parts of the body structure or onto a frame 14 as more particularly disclosed in the drawings. The compartment, whether as a unit or otherwise, will comprise a bottom wall 15, side walls 16 and 17, a rear wall 18, and may or may not be provided with a top wall 19, as found desirable. Along the side walls 16 and 17 slots 20 and 21 are formed, serving in guideways for pins or rollers 22 carried by the cradle, which will be hereinafter more fully described in detail.

For rigidity and lightness the cradle is preferably constructed of stamped sheet metal, but it is to be understood, of course, that the invention is not limited to that material or so formed. As so constructed, however, it comprises a skeleton bottom 23 with a bar 24 in the same plane with the bottom 23. Side flanges 25 are bent upwardly along the parallel opposite sides, and when so turned properly spaced for sliding fit between the side walls 16 and 17 of the compartment.

The side walls are provided with upwardly extending annular parts 26, the lower angular recesses 27 providing for the inclination of the cradle as an entirety downwardly, as shown more particularly at Figure 1.

One inclined side 28 of each of said upwardly extending parts is properly positioned to engage against a block 29, one being carried by each of the side walls 16 and 17, with adjusting screws 30 for adjusting the contact of the blocks with such inclined sides 28.

Adjacent to their normally outer ends the upturned flanges 25 are provided with inclined parts 31 and the closure 12 is provided with coacting wedging members 32 properly proportioned to engage against said inclined parts 31 and force the cradle into engagement with the blocks 29, as shown more particularly at Figure 3.

Merely for strengthening purposes, each of the bars and parts of the skeleton structure of the cradle is turned to form narrow flanges, as shown at 33. Adjacent also to the normally outer end of the cradle, handles 34 are provided. Mounted upon the cradle are a pair of abutments 35 properly curved to fit the perimeter of the tire 36 and braced or otherwise secured in any approved manner, as indicated at 37.

Mounted upon the bar 24 of the cradle is a curved plate 38, the curvature of the plate also corresponding to the curvature of the tire, and hinged as at 39. The back wall 18 is provided with an adjusting screw 40 having a head 41 for engagement with the hinged member 38 to force such plate 38 into engagement with the proximate surface of the tire.

Nuts 42 may be employed as lock nuts for maintaining the adjustment. The closure 12 will be provided with a latch 43 which may be of the lock type, as desired, and is provided further with a handle 44 for actuating the latch and the closure.

It will be noted from the several figures that this closure 12 is shown set at different angles relative to the bottom 15 of the compartment. This is merely illustrative of its coordination with body parts surrounding the same and the several angles or inclinations are to be understood purely as illustrative, and as no limitation.

The tire carrier will preferably be built into the body of the vehicle when the body is constructed, but it will be understood that whether so originally built or later applied, it will set into the body preferably at the rear, its entire mass being within the body and the closure 12 closing the opening therefor into semblance to the surrounding parts of the body.

When the tire is to be removed the closure 12 is opened by the manipulation of the latch and the operator will manually grasp the handles 34 and draw the cradle outwardly. After the upstanding angular part 26 has cleared the opening the inner angle 27 will provide means whereby the cradle may drop downwardly to an inclination, as shown at Figures 1 and 4. The plate 38 which has heretofore clamped the tire has now been released and the tire may simply be removed from the cradle without undoing straps, latches or other fastening means.

When a tire has been returned to the cradle it is merely set against the abutments 35 and the cradle lifted and pushed into the compartment. After the plate 38 makes engagement with the head 41 of the adjusting bolt 40, the plate will be tightened upon the tire to prevent the tire from movement and, therefore, eliminate rattling.

Simultaneously, the inclined sides 28 of the cradle will engage against the blocks 29 and when the wedge members 32 of the closure have engaged against the inclined sections 31 of the cradle and the door latched, all will be held against vibration or noise.

The invention, therefore, has its appealing features in elimination of any possible noise from its use, its maintaining the tire surbstantially in the dark and away from air and light, and furthermore, of automatically releasing the tire for instant removal when the cradle carrying the tire has been withdrawn from the compartment.

Of course, the tire carrier illustrated may be modified and changed in various ways without departing from the invention herein set forth and hereinafter claimed.

I claim:—

1. A tire carrier comprising a compartment having guideways along the sides thereof, a cradle having parts coacting with the guideways to provide for the cradle moving wholly within the compartment and wholly without the compartment, a closure for the compartment, and wedging members carried by the compartment and closure for wedging the cradle within the compartment.

2. A tire carrier comprising a compartment having guideways along its opposite sides, a cradle having means cooperating with said guideways to provide for relative movement between the compartment and cradle, a closure for the compartment, said cradle embodying upturned side members, parts of which are formed as inclinations, blocks positioned within the compartment for engaging the inclined parts, and means carried by the closure for forcing the cradle into such engagement.

3. A tire carrier comprising a compartment having guideways along its opposite sides, a cradle having upturned opposite flanges provided with means for interengagement with the guideways, said flanges having inclined parts, blocks within the compartment positioned to engage some of the inclined parts, a closure for the compartment, and wedge members carried by the closure adapted to engage others of said inclined parts to wedge said cradle rigidly within the compartment.

4. A tire carrier comprising a compartment having guideways along its opposite sides, a cradle having upturned flanges along its opposite sides adapted to move adjacent to the guideways, means providing for relative sliding movement between the compartment and cradle and which means is carried by said upturned sides cooperating with the guideways, said upturned sides having downwardly inclined sections, abutments formed upon the cradle properly contoured to engage the perimeter of the tire, a plate contoured to engage the tire hinged upon the cradle, means carried by the compartment to engage said hinged plate to clamp said plate against the tire, means carried by the compartment for engaging some of said inclined sections of the side flanges, a closure for the compartment, and wedge members carried by the closure proportioned to engage others of said inclined sections to lock said cradle rigidly within the compartment and the tire rigidly within the cradle.

5. A tire carrier comprising a compartment, a cradle mounted to slide within and without the compartment, said cradle comprising upturned side parts, said side parts being provided with angular recesses in their under sides, said recesses being positioned to provide for downwardly inclined swinging action of the cradle when moved without the compartment, and means exerting compression on the cradle to lock the cradle rigidly within the compartment.

6. A tire carrier comprising a compartment, a cradle movable within and without the compartment, and means to support a tire upon the cradle including cooperating parts on the compartment and cradle, respectively, the part of said means on the cradle automatically releasing the tire when the cradle is withdrawn.

7. A tire carrier comprising a compartment, a cradle movable slidably into and out of said compartment, and means carried by the cradle cooperating with a member on the wall of the compartment for automatically clamping the tire when said cradle is inserted in said compartment, and releasing the tire when said cradle is withdrawn from said compartment.

8. A tire carrier comprising a compartment having guideways along the sides thereof, a cradle having means engaging and operating in conjunction with said guideways to provide a sliding connection between the compartment and cradle, means carried by the cradle cooperating with the wall of the compartment to clamp a tire when said cradle is inserted in said compartment and release the tire when said cradle is withdrawn from said compartment.

JOHN J. GRODEN.